(12) United States Patent
Suzuki

(10) Patent No.: US 8,996,252 B2
(45) Date of Patent: Mar. 31, 2015

(54) ELECTRIC POWER STEERING APPARATUS

(75) Inventor: Hiroshi Suzuki, Okazaki (JP)

(73) Assignee: JTEKT Corporation, Osaka-Shi (JP)

( * ) Notice: Subject to any disclaimer, the term of this patent is extended or adjusted under 35 U.S.C. 154(b) by 86 days.

(21) Appl. No.: 13/818,260

(22) PCT Filed: Sep. 6, 2011

(86) PCT No.: PCT/IB2011/002059
§ 371 (c)(1),
(2), (4) Date: Feb. 21, 2013

(87) PCT Pub. No.: WO2012/032395
PCT Pub. Date: Mar. 15, 2012

(65) Prior Publication Data
US 2013/0173118 A1    Jul. 4, 2013

(30) Foreign Application Priority Data
Sep. 7, 2010   (JP) ................................. 2010-200282

(51) Int. Cl.
*B62D 15/02* (2006.01)
*B62D 5/04* (2006.01)
*B62D 6/00* (2006.01)

(52) U.S. Cl.
CPC ............ *B62D 15/025* (2013.01); *B62D 5/0403* (2013.01); *B62D 6/002* (2013.01)
USPC .............................................. 701/41; 701/44

(58) Field of Classification Search
USPC ........................ 701/41–44; 180/443, 444, 446
See application file for complete search history.

(56) References Cited

U.S. PATENT DOCUMENTS

| | | | |
|---|---|---|---|
| 7,308,964 B2 * | 12/2007 | Hara et al. ..................... | 180/446 |
| 7,321,216 B2 * | 1/2008 | Suzuki .......................... | 318/609 |
| 8,656,791 B2 * | 2/2014 | Aoki ........................ | 73/862.331 |
| 8,781,682 B2 * | 7/2014 | Suzuki et al. .................. | 701/41 |
| 2002/0033300 A1 * | 3/2002 | Takeuchi et al. .............. | 180/446 |
| 2005/0093489 A1 * | 5/2005 | Furumi et al. .................. | 318/34 |

(Continued)

FOREIGN PATENT DOCUMENTS

DE   10 2005 044 875 A1   10/2006
EP      0 980 813 A2      2/2000
(Continued)

OTHER PUBLICATIONS

International Search Report issued in International Patent Application No. PCT/IB2011/002059 mailed Jan. 18, 2012.

(Continued)

*Primary Examiner* — Jason Holloway
(74) *Attorney, Agent, or Firm* — Oliff PLC

(57) ABSTRACT

An ECU includes two drive circuits corresponding to the motor coils of two systems independent of each other, and a microcomputer that outputs control signals of two independent systems to the drive circuits. The microcomputer includes a first control signal output portion that outputs the control signal to the drive circuit of the first system by executing an electric current control so as to generate a motor torque that corresponds to the assist force. The microcomputer further includes a second control signal output portion that outputs the control signal to the drive circuit of the second system by executing a position control on the basis of a steering angle command value that is input from a superior ECU via an in-vehicle network so as to change the steering angle of the steering road wheels.

4 Claims, 5 Drawing Sheets

(56) References Cited

U.S. PATENT DOCUMENTS

| | | | |
|---|---|---|---|
| 2005/0159866 A1* | 7/2005 | Takeuchi et al. | 701/41 |
| 2005/0236223 A1* | 10/2005 | Yokota | 180/446 |
| 2006/0219470 A1* | 10/2006 | Imagawa et al. | 180/446 |
| 2007/0176577 A1* | 8/2007 | Kezobo et al. | 318/807 |
| 2009/0032327 A1* | 2/2009 | Yasuda | 180/443 |
| 2009/0240389 A1* | 9/2009 | Nomura et al. | 701/29 |
| 2010/0072738 A1* | 3/2010 | Szabela et al. | 280/771 |
| 2011/0066331 A1* | 3/2011 | Yamashita | 701/42 |
| 2013/0090813 A1* | 4/2013 | Kanekawa et al. | 701/43 |

FOREIGN PATENT DOCUMENTS

| JP | A-2003-040123 | 2/2003 |
|---|---|---|
| JP | A-2004-345468 | 12/2004 |
| JP | A-2005-343260 | 12/2005 |
| JP | A-2006-264374 | 10/2006 |

OTHER PUBLICATIONS

Written Opinion of the International Searching Authority issued in International Patent Application No. PCT/IB2011/002059 mailed Jan. 18, 2012.

Nov. 21, 2013 Office Action issued in European Patent Application No. 11 779 849.6.

Office Action issued in Japanese Application No. 2010-200282 issued on Mar. 4, 2014 (with partial translation).

* cited by examiner

ELECTRIC POWER STEERING APPARATUS

BACKGROUND OF THE INVENTION

1. Field of the Invention

The invention relates to an electric power steering apparatus.

2. Description of Related Art

Among electric power steering apparatuses (EPSs), there is an apparatus that is equipped with an automatic control function of controlling the travel path of a vehicle by changing the steering angle of the vehicle's steering road wheels independently of the steering operation performed by a driver. Examples of this manner of automatic control includes a so-called lane keep assist control of recognizing a travel lane and assisting in the travel of the vehicle along the travel lane (see, e.g., Japanese Patent Application Publication No. 2005-343260 (JP-A-2005-343260)), a so-called parking assist control of assisting in the parking into a parking space (see, e.g., Japanese Patent Application Publication No. 2004-345468 (JP-A-2004-345468)), etc. In many cases, these automatic controls are performed on the basis of an assist command that is input from a superior or host control device (superior or host ECU) via an in-vehicle network.

However, in the construction in which the assist command is transferred via a network, it is inevitable that, due to differences in the communication protocol or specifications, the transfer of the assist command is delayed and therefore the responsiveness declines. Therefore, in an environment with an external disturbance such as a slope of the road surface, side wind, etc., there is a tendency toward large fluctuations of the value of the assist command that is computed so as to control the steering angle position of the steering road wheels. In consequence, particularly in the automatic control that is executed at the time of high-speed travel of the vehicle, there is a possibility of the locus of travel of the vehicle being disturbed.

SUMMARY OF THE INVENTION

The invention provides an electric power steering apparatus capable of smoothly executing an automatic control by restraining the disturbance of the locus of travel of a vehicle even in an environment where an external disturbance exists.

An aspect of the invention relates to an electric power steering apparatus that includes: a steering force assist device that gives an assist force to a steering system based on magnetomotive force that is generated by motor coils of two systems that are provided independently of each other, and control means for controlling operation of the steering force assist device through supply of electric power to the motor coils. The control means includes drive circuits of two systems that are provided independently of each other corresponding to the motor coils. The control means includes first control signal output means for executing output of a control signal to the drive circuit of the first system by executing an electric current control so as to generate a motor torque that corresponds to the assist force. The control means includes second control signal output means for executing output of a control signal to the drive circuit of the second system by executing a position control based on a position command that is input so as to change steering angle of a steering road wheel.

That is, fundamentally, automatic controls, such as a lane keep assist control and the like, are realized by controlling the steering angle position. Then, the position control does not require such a high response as the power assist control (electric current control) requires. Therefore, by executing the position control for executing the automatic control independently of an electric current control (torque control) for executing the power assist control as in the foregoing construction, it is possible to optimize the responsiveness of the position control without causing a decline in the responsiveness in the power assist control, and therefore restrain the influences of fluctuations of the position command.

As a result, it becomes possible to smoothly execute the automatic control while restraining disturbance of the locus of travel of a vehicle even in an environment where an external disturbance exists. Besides, this makes it possible to smoothly and simultaneously perform the torque control and the position control even in an environment where an external disturbance exists.

In the foregoing aspect, the steering force assist device may use, as a drive source, an electric motor that includes a stator and a rotor that are used commonly for the motor coils.

According to this construction, the electric current control (torque control) for executing the power assist control, and the position control for executing the automatic control can be executed simultaneously and independently without increasing the size of the apparatus.

In the foregoing aspect, the electric motor may be a brushless electric motor.

According to this construction, the space allowance resulting from the absence of the brush of the electric motor becomes conspicuous if the electric motor has motor coils of two systems that are independent of each other. Therefore, this construction makes it possible to simplify and reduce the size of the electric motor as a drive source.

In the foregoing aspect, the control means may execute a position feedback loop of the position control, and may execute, as a minor loop of the position feedback loop, a feedback loop of at least one of a speed control, an electric current control and a voltage control.

According to this construction, the automatic control can be more smoothly executed.

According to the foregoing aspect of the invention, it is possible to provide an electric power steering apparatus capable of smoothly executing the automatic control while restraining disturbance in the locus of travel of a vehicle even in an environment where an external disturbance exits.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
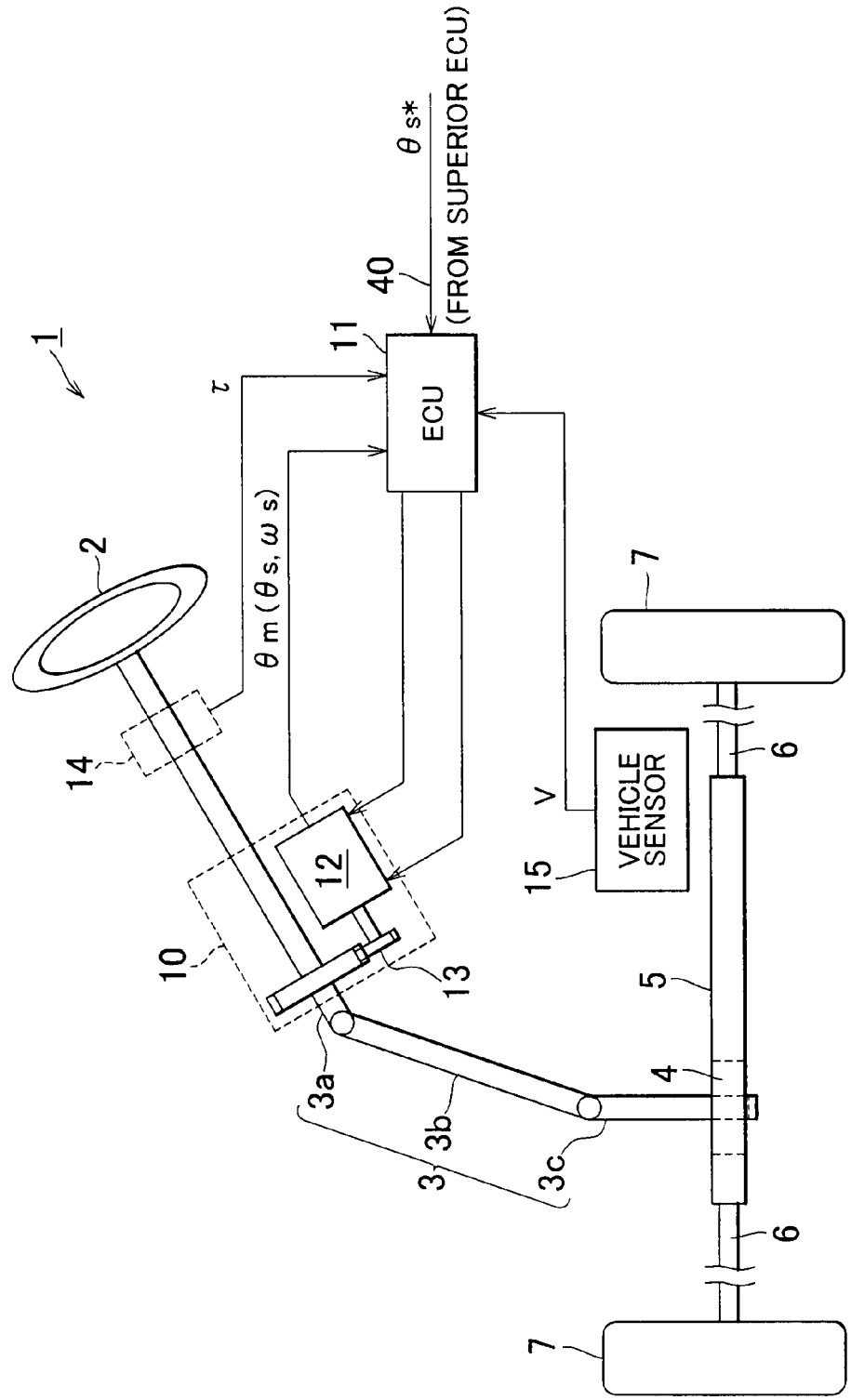
FIG. 1 is a schematic construction diagram of an electric power steering apparatus (EPS)

Hereinafter, an embodiment of the invention will be described with reference to the drawings. As shown in FIG. 1, in an electric power steering apparatus (EPS) 1 of the embodiment, a steering shaft 3 to which a steering wheel 2 is fixed is linked to a rack shaft 5 via a rack-and-pinion mechanism 4.

Rotation of the steering shaft 3 involved in the steering operation is converted into linear motion of the rack shaft 5 in either one of two opposite directions by the rack-and-pinion mechanism 4. Incidentally, the steering shaft 3 in this embodiment is made up of a column shaft 3a, an intermediate shaft 3b and a pinion shaft 3c that are linked together. Linear motion of the rack shaft 5 caused by rotation of the steering shaft 3 is transmitted to knuckles (not shown) via tie rods 6 that are connected to two ends of the rack shaft 5, so that the steering angle of the steering road wheels 7, that is, the travel direction of the vehicle, is changed.

Besides, the EPS 1 includes an EPS actuator as a steering force assist device that gives assist force for assisting in steering operation to a steering system, and an ECU 11 as control means for controlling the actuation of the EPS actuator 10.

In this embodiment, the EPS actuator 10 is constructed as a so-called column-type EPS actuator whose electric motor 12 employed as a drive source is drivingly connected to the column shaft 3a via a speed reduction mechanism 13. The EPS actuator 10 transmits rotation of the electric motor 12 to the column shaft 3a while reducing the speed of the rotation, whereby the motor torque is given as assist force to the steering system.

On the other hand, the ECU 1 is connected to a torque sensor 14 and a vehicle speed sensor 15. On the basis of the steering torque τ and the vehicle speed V detected from output signals of the sensors, the ECU 11 computes the assist force (target assist force) that is to be given to the steering system. Then, in order to cause the EPS actuator 10 to generate the target assist torque, the ECU 11 controls the actuation of the EPS actuator 10, that is, controls the assist force given to the steering system, through supply of the electric power to the electric motor 12 provided as the drive source (power assist control).

Figure 2:
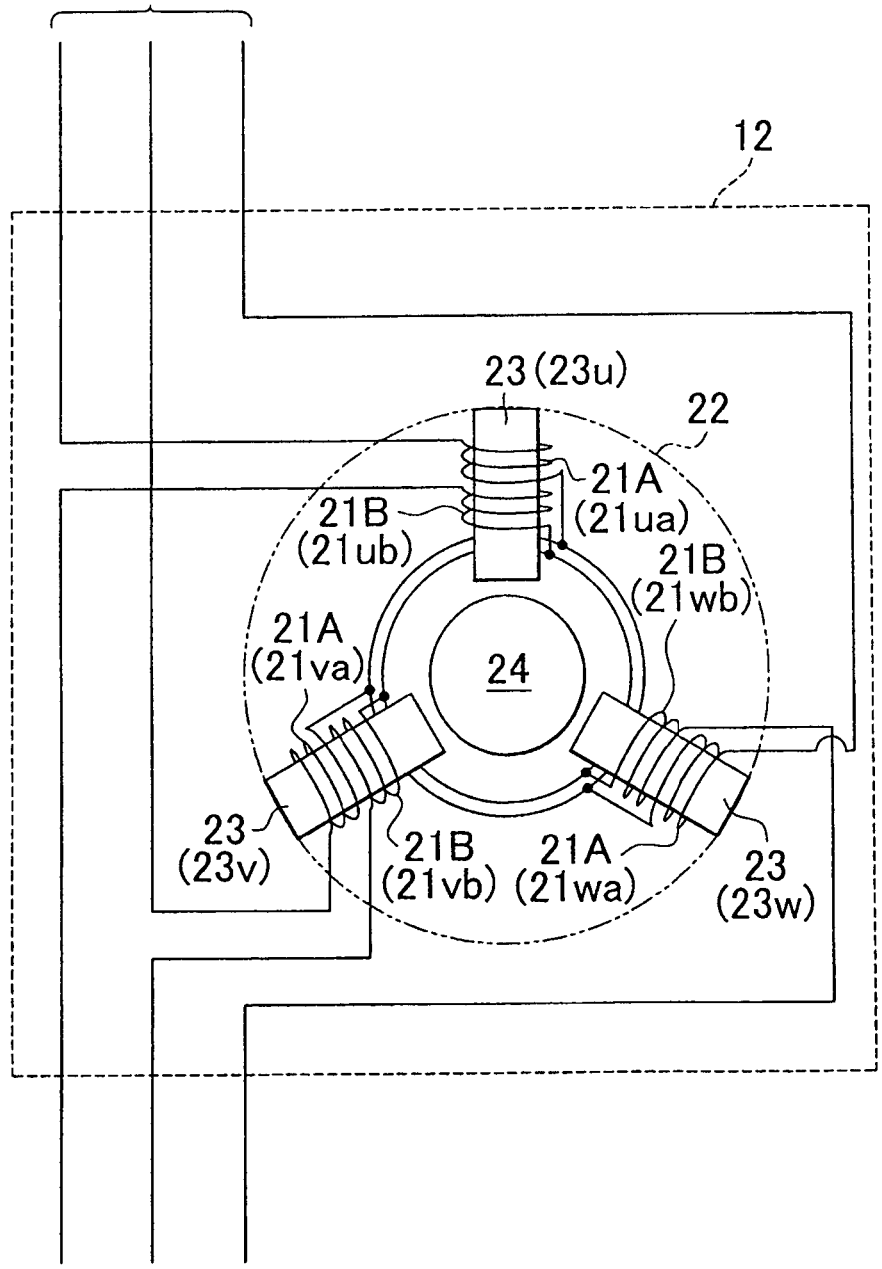
FIG. 2 is a schematic construction diagram of an electric motor.

Next, an electric construction of the EPS of the embodiment will be described. As shown in FIG. 2, the electric motor 12 in the embodiment is formed by winding motor coils 21A and 21B of two independent systems around a single stator 22. Concretely, the motor coil 21A (21ua, 21va and 21wa) of a first one of the two systems and the motor coil 21B (21ub, 21vb and 21wb) of a second system are each wound separately for a corresponding one of phases (U, V and W) on a corresponding one of teeth 23 (23u, 23v and 23w) of the stator 22. Then, at a radially inward side of the teeth 23 (23u, 23v and 23w), a rotor 24 is rotatably supported.

Specifically, the electric motor 12 in the embodiment has the stator 22 and the rotor 24 that are used commonly for the motor coils 21A and 21B of the two systems. The rotor 24 rotates on the basis of the magnetomotive force generated by motor coils 21A and 21B that are wound around the teeth 23 (23u, 23v and 23w). Then, the ECU 11 in the embodiment controls the motor torque of the electric motor 12 by supplying drive electric power to the motor coils 21A and 21B independently of each other.

Figure 3:
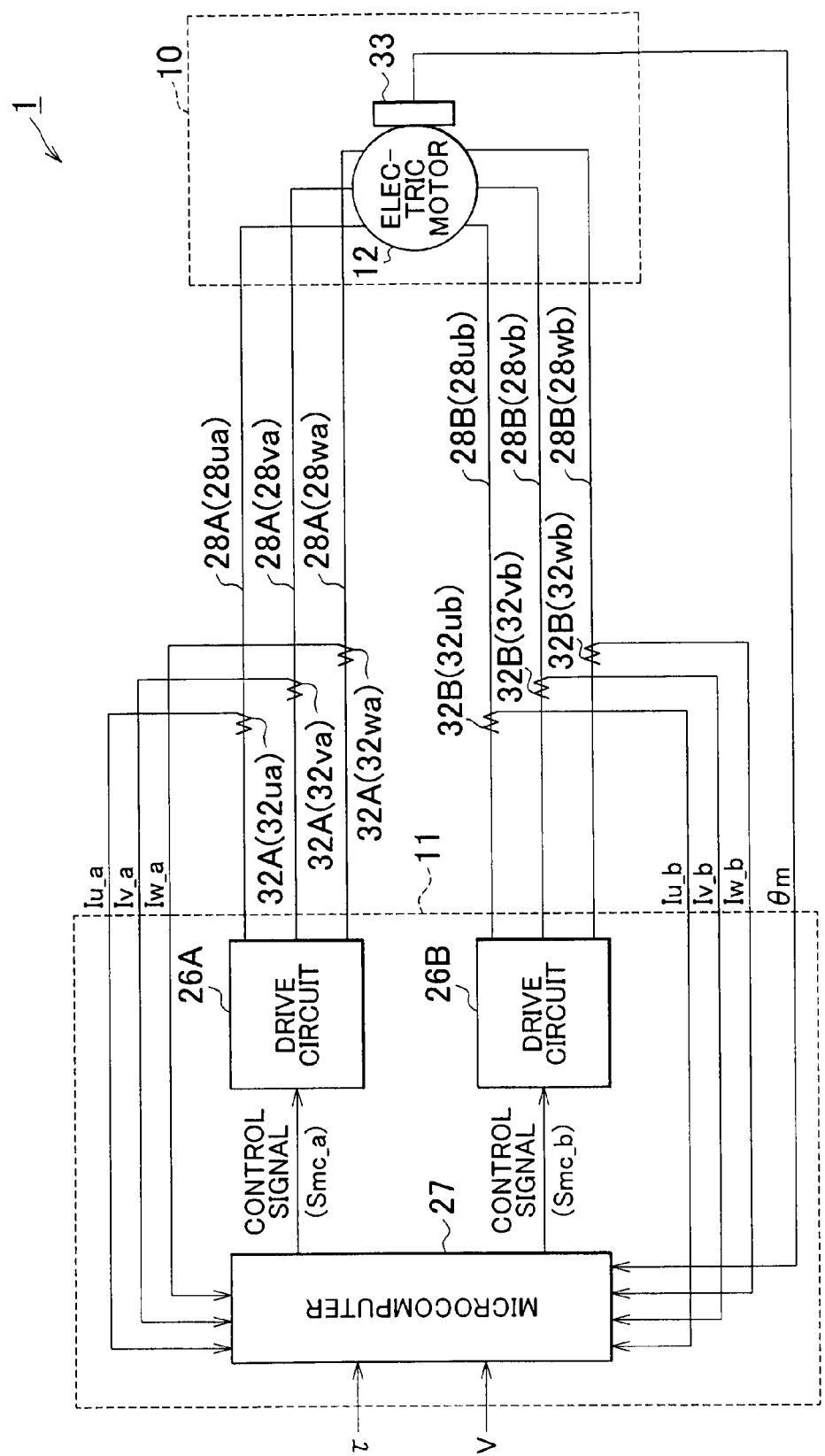
FIG. 3 is a control block diagram of the EPS.

As shown in FIG. 3, the ECU 11 in the embodiment includes two drive circuits 26A and 26B that are provided independently of each other corresponding to the motor coils 21A and 21B, and a microcomputer 27 that outputs control signals Smc_a and Smc_b to the drive circuits 26A and 26B, respectively, independently of each other.

Concretely, the drive circuit 26A is connected to the motor coils 21A of the first system via power lines 28A (28ua, 28va and 28wa), and the drive circuit 26B is connected to the motor coils 21B of the second system via power lines 28B (28ub, 28vb and 28wb). Besides, the control signal Smc_a that the microcomputer 27 outputs is input to the drive circuit 26A, and the control signal Smc_b that the microcomputer 27 outputs is input to the drive circuit 26B. Incidentally, in the embodiment, each of the drive circuits 26A and 26B employs a well-known PWM inverter made up of three basic units (three arms) each of which includes a pair of switching elements connected in parallel, and which correspond to the three phases and are connected in parallel. The control signals Smc_a and Smc_b that the microcomputer 27 outputs define the on-duty ratios of the three phase arms. The ECU 11 in the embodiment supplies drive electric power that the drive circuits 26A and 26B output on the basis of the control signals Smc_a and Smc_b to the corresponding motor coils 21A and 21B independently of each other.

Figure 4:
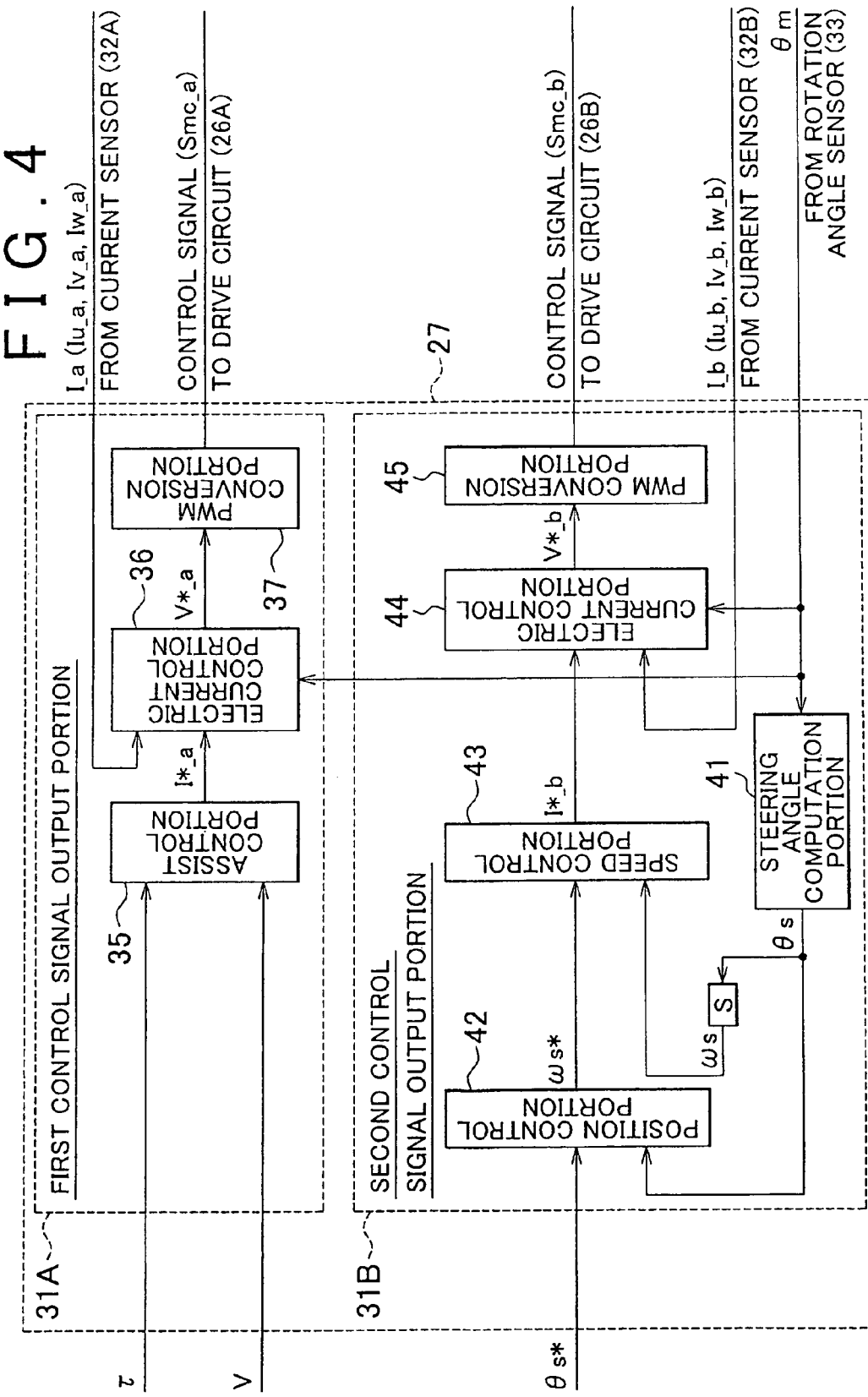
FIG. 4 is another control block diagram of the EPS.

This will be described in detail. As shown in FIG. 4, the microcomputer 27 in the embodiment includes a first control signal output portion 31A as first control signal output means for outputting the control signal Smc_a to the drive circuit 26A of the first system, and a second control signal output portion 31B as second control signal output means for outputting the control signal Smc_b to the drive circuit 26B of the second system.

In this embodiment, the first control signal output portion 31A receives input of the steering torque τ and the vehicle speed V detected by the torque sensor 14 and the vehicle speed sensor 15. The first control signal output portion 31A computes an electric current command value I*_a that corresponds to a target assist force on the basis of the steering torque τ and the vehicle speed V. Besides, the first control signal output portion 31A also receives input of an actual value I_a of electric current that is passed through the motor coils 21A of the first system and that is detected by the electric current sensors 32A, and an electric motor rotation angle θm that is detected by an electric motor resolver 33 (see FIG. 3). Then, the first control signal output portion 31A outputs the control signal Smc_a to the drive circuit 26A of the first system that corresponds to the first control signal output portion 31A, by executing an electric current feedback control of causing the detected actual electric current value I_a to follow the electric current command value I*_a that the first control signal output portion 31A computes.

Concretely, in the first control signal output portion 31A in the embodiment, the steering torque τ and the vehicle speed V are input to an assist control portion 35. The assist control portion 35 computes the electric current command value I*_a so that greater motor torque, that is, greater assist force, is generated the greater the steering torque τ is and the slower the vehicle speed V is. Furthermore, the electric current command value I*_a are input to an electric current control portion 36, together with the actual electric current value I_a detected by the electric current sensors 32A. Then, the electric current control portion 36 executes an electric current feedback computation on the basis of an electric current deviation between the electric current command value I*_a and the actual electric current value I_a.

In this embodiment, electric current sensors 32A (32ua, 32va and 32wa) detect, as the actual electric current value I_a, the phase current values Iu_a, Iv_a and Iw_a of current passed through the motor coils 21A of the first system. Then, the electric current control portion 36 in the embodiment executes the electric current feedback computation in a d/q coordinate system by converting the phase current values Iu_a, Iv_a and Iw_a into d-axis currents and q-axis current in the d/q coordinate system (d/q conversion).

That is, the assist control portion 35 in the embodiment computes a q-axis electric current command value as the electric current command value I*_a (the d-axis electric current command value is "0"). Then, the electric current control portion 36 computes a voltage command value V*_a that corresponds to each of the phases of the motor coils 21A by mapping on a three-phase alternating-current coordinates a voltage command value in the d/q coordinate system obtained through execution of the electric current feedback computation (inverse d/q conversion).

Then, the first control signal output portion 31A in the embodiment outputs the control signal Smc_a that a PWM conversion portion 37 generates on the basis of the voltage command value V*_a, to the corresponding drive circuit 26A of the first system.

On the other hand, the second control signal output portion 31B receives input of a position command regarding the steering wheel 2, that is, a steering angle command value θs*, that is input from the superior ECU via the in-vehicle network (CAN: Controller Area Network) 40 (see FIG. 1). Incidentally, in the embodiment, the steering angle command value θs* is input as a control command for automatically controlling the path of the vehicle and, more specifically, a control command for executing a so-called lane keep assist control, by changing the steering angle of the steering road wheels 7 independently of the steering operation of the driver. Besides, the second control signal output portion 31B in the embodiment detects the actual steering angle of the steering wheel 2, that is, the steering angle θs, on the basis of the electric motor rotation angle θm that is detected by the electric motor resolver 33. Then, the second control signal output portion 31B outputs the control signal Smc_b to the corresponding drive circuit 26B of the second system by executing the position feedback control so as to cause the steering angle θs detected as the actual steering angle to follow the steering angle command value θs* input to the second control signal output portion 31B.

Concretely, the electric motor rotation angle θm input to the second control signal output portion 31B is converted into the steering angle θs by the steering angle computation portion 41. The steering angle Os is input together with the steering angle command value θs* to a position control portion 42. Then, the position control portion 42 executes a position feedback computation on the basis of a positional deviation between the steering angle command value θs* and the steering angle θs.

The second control signal output portion 31B in the embodiment includes a speed control portion 43 and an electric current control portion 44 that form feedback loops of a speed control and an electric current control (torque control), respectively, as minor loops of a position feedback loop that the position control portion 42 forms.

That is, the position control portion 42 computes a steering angular speed command value ωs* through execution of the position feedback computation, and the speed control portion 43 computes an electric current command value I*_b on the basis of a speed deviation between the steering angular speed command value ωs* and an actual steering angular speed ωs. Furthermore, the electric current control portion 44 computes a voltage command value V*_b by executing the electric current feedback computation on the basis of an electric current deviation between the electric current command value I*_b and an actual electric current value I_b that is detected by electric current sensors 32B. Incidentally, the manner of the electric current detection performed by the electric current sensors 32B (32ub, 32vb and 32wb) (the detection of the three phase current values Iu_b, Iv_b and Iw_b) and the manner of the electric current feedback computation that the electric current control portion 44 executes are substantially the same as the manner of the electric current detection that the electric current sensors 32A of the first system performs and the manner of the electric current feedback computation that the electric current control portion 36 executes, respectively. Then, the second control signal output portion 31B in the embodiment outputs the control signal Smc_b that the PWM conversion portion 45 generates on the basis of the voltage command value V*_b, to the corresponding drive circuit 26B of the second system.

In the foregoing manner, the microcomputer 27 in the embodiment outputs the control signals Smc_a and Smc_b to the drive circuits 26A and 26B of the two systems, respectively, independently of each other. Then, as shown in FIG. 5, the ECU 11 in the embodiment executes an electric current control (torque control) for executing the power assist control, and a position control for executing an automatic control, simultaneously and independently of each other.

Figure 5:
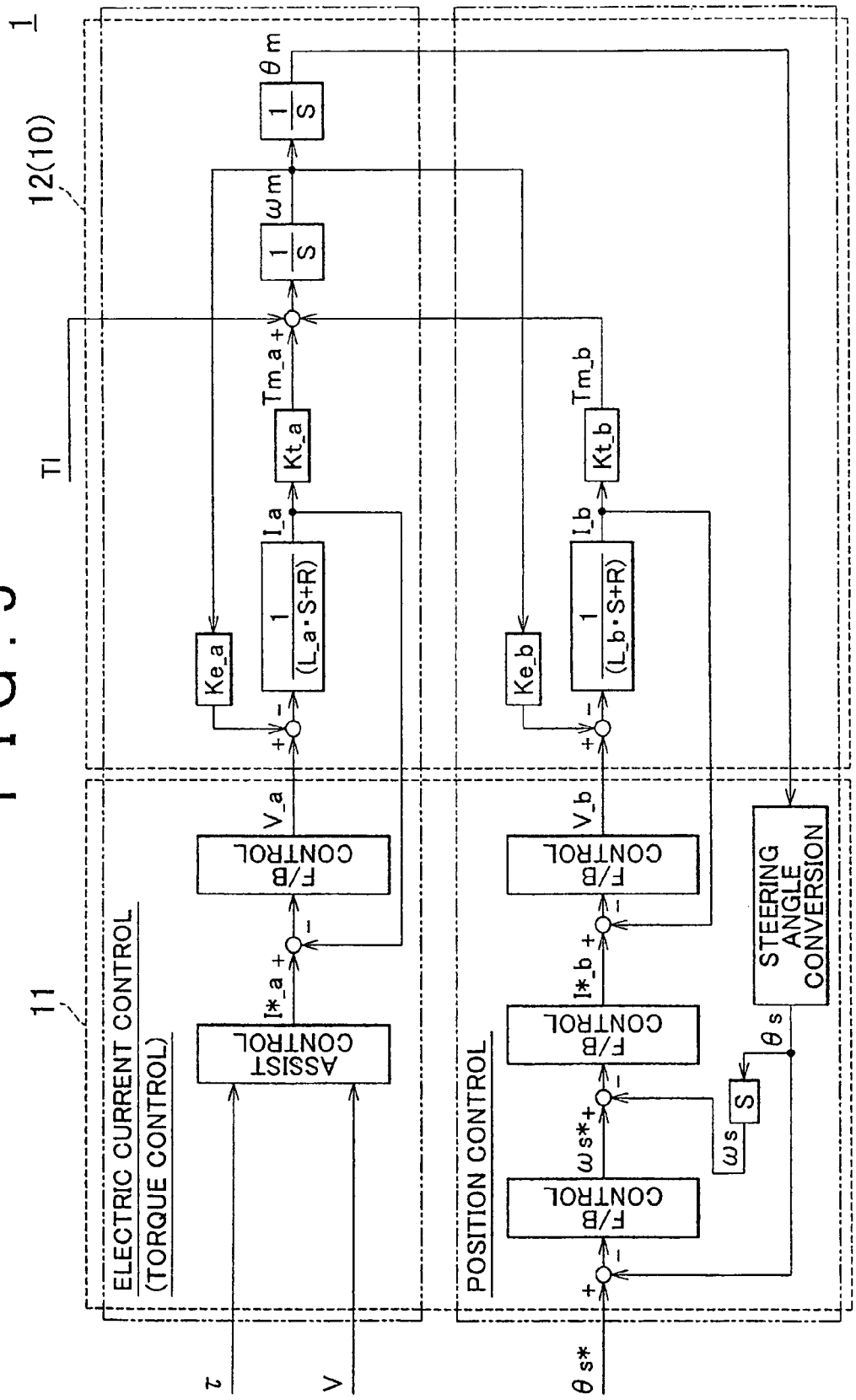
FIG. 5 is a block diagram showing a manner of an electric motor control in an embodiment of the invention.

In the block diagram of FIG. 5, "Tm" is motor torque, and "Tl" is load torque, and "Ke" is a counter electromotive voltage constant. Furthermore, "1/(L·S+R)" is electric motor impedance (where R is armature winding wire resistance, L is inductance, and S is a differential operator).

According to the embodiment, operation and effects as follows can be obtained.

(1) The ECU 11 includes the two drive circuits 26A and 26B provided corresponding to the motor coils 21A and 21B of the two systems independent of each other, and the microcomputer 27 that outputs the independent control signals Smc_a and Smc_b of the two systems to the drive circuits 26A and 26B. The microcomputer 27 includes the first control signal output portion 31A that outputs the control signal Smc_a to the drive circuit 26A of the first system by executing the electric current control so as to generate the motor torque that corresponds to the assist force. Furthermore, the microcomputer 27 also includes the second control signal output portion 31B that outputs the control signal Smc_b to the drive circuit 26B of the second system by executing the position control on the basis of the steering angle command value θs* that is input from the superior ECU via the in-vehicle network 40, so as to change the steering angle of the steering road wheels.

That is, fundamentally, the automatic control, such as the lane keep assist control or the like, is realized by controlling the steering angle position. In the position control, such a high response as required in the power assist control (electric current control) is not required. Therefore, as in the foregoing construction, by executing the position control for executing the automatic control independently of the electric current control (torque control) for executing the power assist control, it is possible to optimize the response of the position control without causing a decline in the responsiveness in the power assist control, and therefore to restrain the influence caused by changes of the position command (steering angle command value θs*). As a result, even in an environment with an external disturbance, it is possible to restrain the disturbance in the locus of travel and smoothly execute the automatic control.

(2) The EPS actuator 10 uses as a drive source the electric motor 12 that has the stator 22 and the rotor 24 that are common to the motor coils 21A and 21B of the two systems. Therefore, the electric current control (torque control) for executing the power assist control, and the position control for executing the automatic control can be executed simultaneously and independently of each other without increasing the size of the apparatus.

(3) The second control signal output portion 31B includes the speed control portion 43 and the electric current control portion 44 that form the feedback loops of the speed control and the electric current control (torque control) as minor loops of the position feedback loop that the position control portion 42 forms. Therefore, the automatic control can be executed more smoothly.

Incidentally, the foregoing embodiment may be modified or changed as follows.

(a) Although in the foregoing embodiment, the invention is embodied as the so-called column type EPS 1, the invention may also be applied to a so-called pinion type or rack-assist type EPS.

(b) In the embodiment, the EPS actuator 10 uses as a drive source the electric motor 12 that has the stator 22 and the rotor 24 that are used commonly for the motor coils 21A and 21B of the two systems. However, this construction is not restrictive, that is, each motor coil may have its own stator or its own rotor. Furthermore, the invention is also applicable to a construction that employs two electric motors as drive sources.

(c) Besides, the motor coils of each system may be disposed so as to have a relationship in which the phases of the coils are deviated from each other. Furthermore, the invention may also be embodied not only as the EPS but also as an electric motor control system that controls an electric motor that is equipped with motor coils of two systems provided independently of each other.

(d) Although in the foregoing embodiment, the electric motor 12 used is a brushless electric motor in which the motor coils 21A and 21B of the independent two systems are wound on the same stator 22, the invention may also be embodied in a brush-equipped electric motor that includes an armature rotor that has motor coils of two systems.

(e) In the foregoing embodiment, the ECU 11 has the two drive circuits 26A and 26B that are provided independently corresponding to the motor coils 21A and 21B. However, the construction in which each system is equipped with a back-up drive circuit, and the like, and the numbers of drive circuits in each system, are not particularly limited.

(f) In the foregoing embodiment, the feedback loops of the speed control and the electric current control (torque control) are provided as minor loops of the position feedback loop. However, the minor loops may be changed as appropriate; for example, at least one of the speed feedback loop and the electric current feedback loop may be omitted, or a voltage feedback loop may be added.

(g) In the foregoing embodiment, the lane keep assist control is executed as an automatic control. However, this is not restrictive. The manner of the automatic control may be any manner as long as the control is realized by the position control regarding the steering angle (electric motor rotation angle); for example, the automatic control may be a parking assist control, a control of controlling the steering angle of the steering road wheels so as to control the posture of the vehicle, etc.

(h) Although in the foregoing embodiment, the actual steering angle of the steering wheel 2, that is, the steering angle θs, is detected on the basis of the electric motor rotation angle θm detected by the electric motor resolver 33, it is also permissible to adopt a construction in which the steering angle θs is directly detected by using a steering sensor.

The invention claimed is:

1. An electric power steering apparatus comprising:
 a steering force assist device that gives an assist force to a steering system based on magnetomotive force that is generated by motor coils of two systems that are provided independently of each other, the two systems including a first system and a second system; and
 a controller configured to control operation of the steering force assist device through supply of electric power to the motor coils,
 the controller including:
  a drive circuit of the first system and a drive circuit of the second system that are provided independently of each other, the first system being configured to control the assist force given to the steering system and the second system being configured to control a steering angle of a steering road wheel independently of a steering operation of a driver;
  a first control signal output unit configured to output a first control signal to the drive circuit of the first system by executing an electric current control so as to generate a motor torque that corresponds to the assist force; and
  a second control signal output unit configured to output a second control signal to the drive circuit of the second system by executing a position control based on a position command that is input so as to change the steering angle of the steering road wheel.

2. The electric power steering apparatus according to claim 1, wherein the steering force assist device uses, as a drive source, an electric motor that includes a stator and a rotor.

3. The electric power steering apparatus according to claim 2, wherein the electric motor is a brushless electric motor.

4. The electric power steering apparatus according to claim 1, wherein the controller executes a position feedback loop of the position control, and executes, as a minor loop of the position feedback loop, a feedback loop of at least one of a speed control, an electric current control and a voltage control.

* * * * *